(12) United States Patent
Tanaka

(10) Patent No.: US 6,969,097 B2
(45) Date of Patent: Nov. 29, 2005

(54) FRONT BUMPER

(75) Inventor: Hirofumi Tanaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/909,681

(22) Filed: Aug. 2, 2004

(65) Prior Publication Data

US 2005/0046205 A1 Mar. 3, 2005

(30) Foreign Application Priority Data

Aug. 27, 2003 (JP) .............................. 2003-303361

(51) Int. Cl.[7] ............................................. B60R 19/52
(52) U.S. Cl. ........................ 293/115; 52/660; 180/68.6
(58) Field of Search ..................... 293/115; 296/193.1; 52/660, 664, 663; 180/68.6

(56) References Cited

U.S. PATENT DOCUMENTS 6,041,878 A * 3/2000 Daniels et al. ............. 180/68.6
6,206,438 B1 * 3/2001 Pueyo ........................ 293/115
6,405,819 B1 * 6/2002 Ohkura et al. ............. 180/68.1

FOREIGN PATENT DOCUMENTS

JP 2002-059794 2/2002

* cited by examiner

Primary Examiner—Joseph D. Pape
(74) Attorney, Agent, or Firm—Hamre, Schumann, Mueller & Larson, P.C.

(57) ABSTRACT

A front bumper has a grill 1 in which a plurality of opening sections 30 are arranged in an aligned pattern. Further, wall sections 50 are fanned in the respective opening sections so that each wall section stands upright on a lower section 47 of each of frame sections 31 defining the opening sections 30 of the grill 21 and so that an upper edge section 48 conforms to an upper section 49 of the frame section 31. The line of sight of the person viewing a vehicle from an upwardly oblique position is interrupted as a result of the wall sections 50 overlapping the upper sections 49 of the frame sections 31.

5 Claims, 4 Drawing Sheets

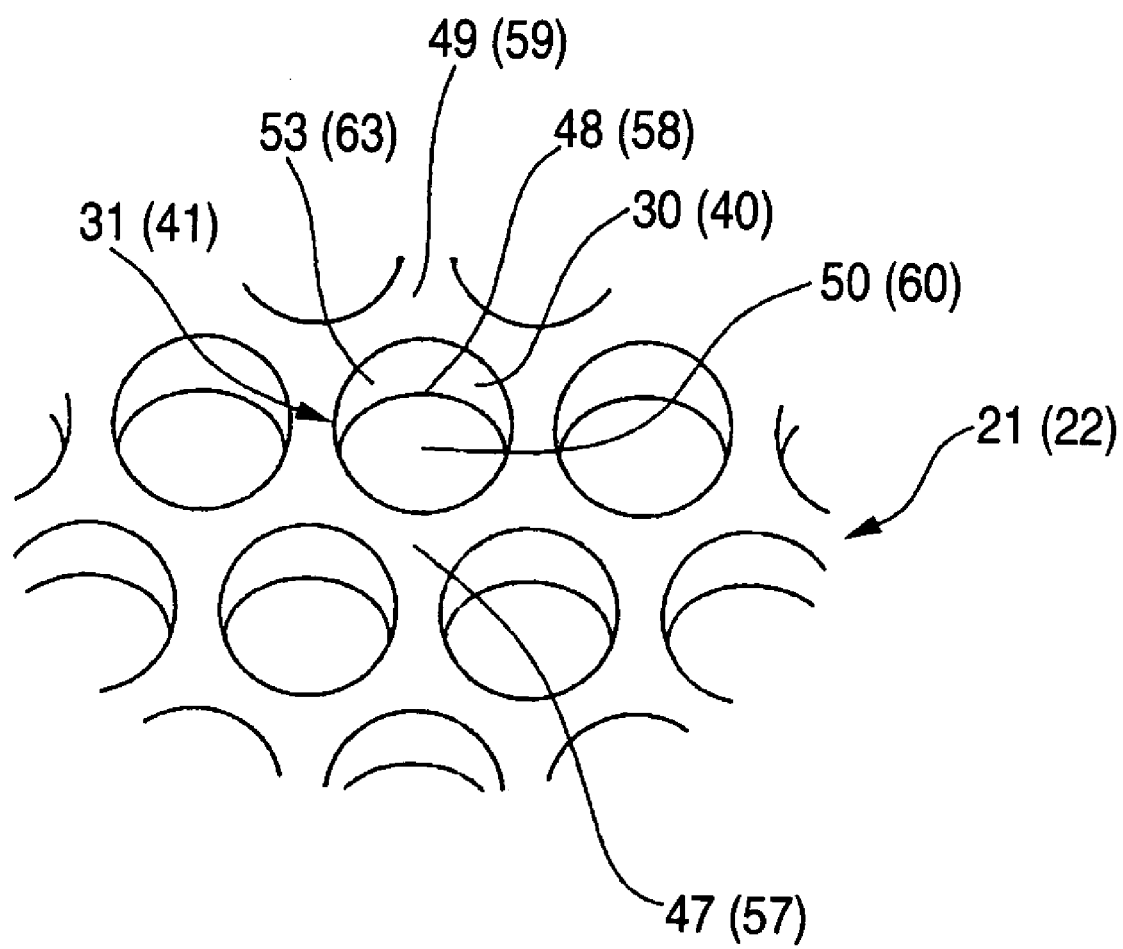

FRONT BUMPER

BACKGROUND OF THE INVENTION

The present invention relates to a front bumper capable of improving the appearance of a vehicle.

A technique for improving the appearance of a vehicle includes a technique for interrupting, at the lowest layer of a fin, the line of sight of a person viewing a front bumper from an obliquely upward position, by means of extending the lowest layer of fin of a front bumper having a grill provided with a plurality layers of fins to a rearward position of the vehicle, thereby keeping out of view internal components provided at interior positions deeper than the position of the lowest fin (see, e.g., Patent Document 1).

[Patent Document 1] JP-A No. 2002-59794

However, according to Patent Document 1, the fin of the grill is extended rearward of the vehicle, thereby keeping the internal components out of view. Hence, this technique cannot be adopted unless a dimensional allowance exists between the front bumper and the internal components.

SUMMARY OF THE INVENTION

Therefore, the present invention is aimed at providing a front bumper capable of keeping internal components out of view even when no dimensional allowance exists between the front bumper and the internal components.

To attain the object, the present invention of aspect 1 is characterized by including: a grill (e.g., an upper grill 21 or a lower grill 22 in an embodiment) having a plurality of opening sections (e.g., opening sections 30 or 40 in the embodiment) arranged in an aligned manner; and wall sections (e.g., a wall section 50 or 60 in the embodiment) formed into a shape so that the wall sections stands upward on lower portions (e.g., lower portions 47 or 57 in the embodiment) of frame sections (e.g., frame sections 31 or 41 in the embodiment) defining the opening sections of the grill and so that upper edge sections (e.g., upper edge sections 48 or 58 in the embodiment) thereof conform to upper portions (e.g., upper portions 49 or 59 embodiment) of the frame sections.

An invention of aspect 2 based on the invention of aspect 1 is characterized in that the opening sections form a rhomboid shape, and in that the wall sections form a rhomboid shape smaller than that of the opening sections.

An invention of aspect 3 based on the invention of aspect 1 is characterized in that the opening sections form a circular shape, and in that the wall sections forms an essentially-oval shape which is shorter than the opening sections in a vertical direction.

According to the invention of aspect 1, the wall sections are formed into a shape so that the wall sections stand upward on the lower portions of the frame sections defining the opening sections of the grill and so that the upper edge sections conform to the upper portions of the frame sections. Hence, the line of sight of a person viewing a front bumper from an obliquely upward position is interrupted by the wall sections, thereby keeping internal components out of view. Thus, the front bumper has a structure in which the upwardly-extending wall sections are formed on the lower portions of the frame sections, and therefore the bumper can be formed without regard to the dimension between the internal components and the bumper. Even when a sufficient dimensional allowance is not provided between the internal components and the bumper, the internal components can be kept out of view.

According to the invention of aspect 2, the opening sections form a rhomboid shape, and the wall sections form a rhomboid shape smaller than that of the opening sections. Therefore, there can be ensured the height of the interstices between portions of the openings sections not blocked by the wall sections, which in turn ensures ventilation performance and enables superior cooling of the internal components disposed at the rear of the opening sections.

According to the invention of aspect 3, the opening sections form a circular shape, and the wall section forms an essentially-oval shape which is shorter than the opening sections in the vertical direction. Therefore, there can be ensured the height of the interstices between the portions of the openings sections not blocked by the wall section, which in turn ensures ventilation performance and enables superior cooling of the internal components disposed at the rear of the opening sections.

BRIEF DESCRIPTION OF THE DRAWINGS

FIG. 7 is a fragmentary-enlarged front view of another upper grill (or another lower grill) of the front bumper of the embodiment of the invention.

DETAILED DESCRIPTION OF THE PREFERRED EMBODIMENTS

A front bumper according to an embodiment of the invention will be described hereinbelow by reference to the drawings. Longitudinal and lateral directions used herein denote longitudinal and lateral directions of a vehicle when the vehicle moves forward.

Figure 1:
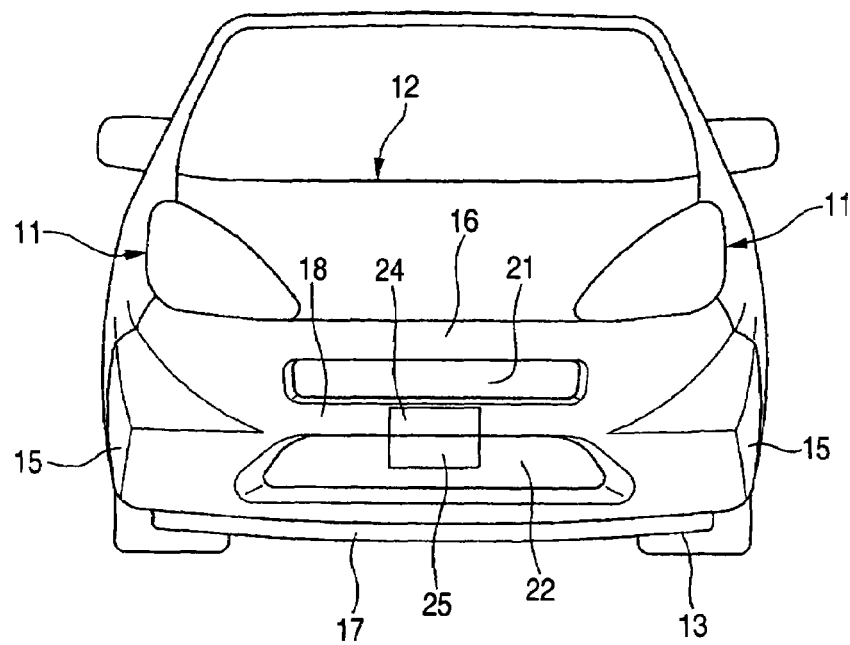
FIG. 1 is a front view showing the front section of a vehicle to which a front bumper of an embodiment of the invention is applied.

FIG. 1 shows a front section of the vehicle. In the front section of the vehicle, a front bumper 13 of the embodiment is attached to a position below headlamps 11 and a hood 12.

The front bumper 13 includes side constituent sections 15 provided on both sides of the vehicle in the widthwise direction thereof; a front upper constituent section 16 for connecting upper portions of the side constituent sections 15 in the widthwise direction of the vehicle; a front lower constituent section 17 for connecting lower portions of the side constituent sections 15 in the widthwise direction of the vehicle; and a front intermediate constituent section 18 which is provided between the front upper constituent section 16 and the front lower constituent section 17 and connects middle portions of the side constituent sections 15 in the widthwise direction of the vehicle.

The front bumper 13 is surrounded by the side constituent sections 15 provided on both sides thereof, the front upper constituent section 16, and the front intermediate constituent section 18. An upper grill 21 is formed in an upper portion in the center of the front bumper 13 in the widthwise direction of the vehicle.

Here, a number plate mount section 24 to be used for mounting an unillustrated number plate is formed in the center of the front intermediate constituent section 18 in the widthwise direction of the vehicle. Another number plate mount section 25 to be used for mounting the number plate is also formed in an upper center portion of the lower grill 22 in the widthwise direction of the vehicle.

Figure 2:
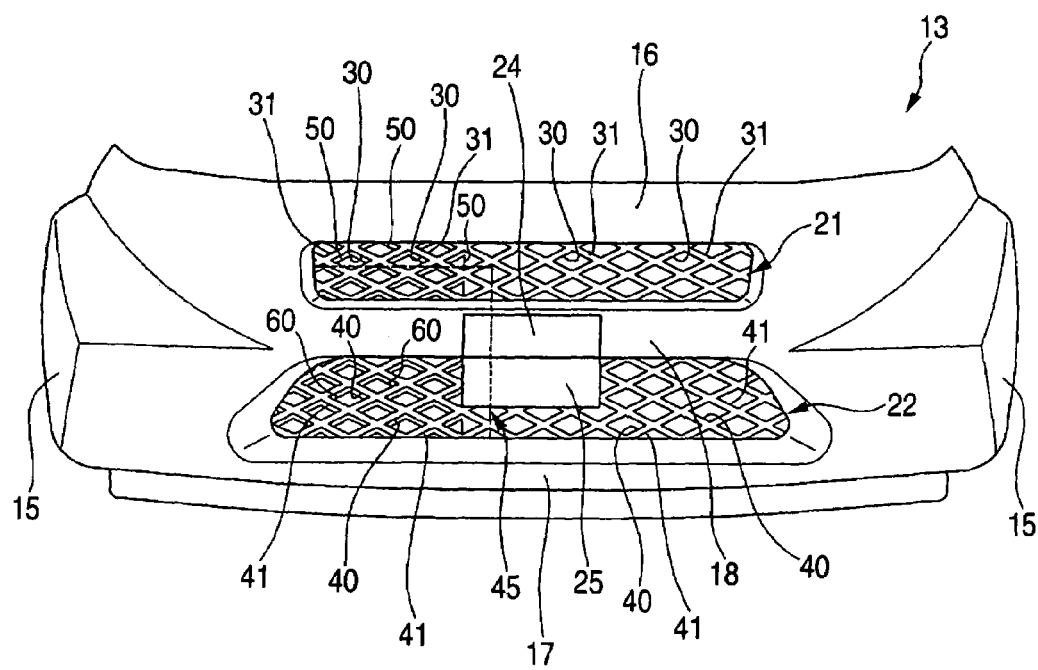
FIG. 2 is a front view showing the front bumper of the embodiment of the invention.
Figure 3:
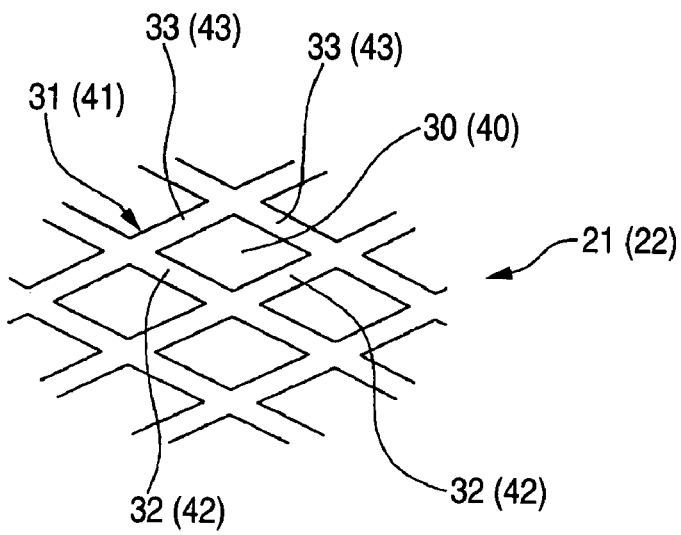
FIG. 3 is an enlarged front view of a left-side portion of an upper grill (or a lower grill) of the front bumper of the embodiment of the invention.

As shown in FIG. 2, a plurality of opening sections 30 longitudinally penetrating through the upper grill 21 are arranged in an aligned manner in the entirety of the upper grill 21. In short, a plurality of frame sections 31 having the opening sections 30 formed therein are arranged in an aligned pattern in the upper grill 21. As shown in FIG. 3, each of the frame sections 31 has a rhomboid shape. The rhomboid shape is formed from lower side sections 32 which extend straight upward from a lower end of the rhomboid in opposite directions with respect to the widthwise direction of the vehicle, to the same length and at the same angle with respect to a horizontal line. The rhomboid shape is also formed from upper side sections 33 which extend straight upward from the respective upper end sections of the respective lower side sections 32, to the same length and at the same angle with respect to the horizontal line so as to come close to each other. Consequently, the opening sections 30 each also form a rhomboid shape. Such frame sections 31 are arranged orderly in the vertical and horizontal directions. By means of the arrangements, the respective side sections 32, 33 are shared between the frame sections 31 which are obliquely adjacent to each other.

As shown in FIG. 2, a plurality of opening sections 40 longitudinally penetrating through the lower grill 22 are arranged in an aligned manner in the lower grill 22, exclusive of the number plate mount section 25. In short, a plurality of frame sections 41 having the opening sections 40 formed therein are arranged in an aligned pattern in the lower grill 22. As indicated by the reference numerals provided in parentheses shown in FIG. 3, each of the frame sections 41 also has a rhomboid shape. The rhomboid shape is formed from lower side sections 42 which extend straight upward from a lower end of the rhomboid in opposite directions with respect to the widthwise direction of the vehicle, to the same length and at the same angle with respect to a horizontal line. The rhomboid shape is also formed from upper side sections 43 which extend straight upward from the respective upper end sections of the respective lower side sections 42, to the same length and at the same angle with respect to the horizontal line so as to come close to each other. Consequently, the opening sections 40 each also form a rhomboid shape. Such frame sections 41 are arranged orderly in the vertical and horizontal directions. By means of the arrangements, the respective side sections 42, 43 are shared between the frame sections 41 which are obliquely adjacent to each other.

Figure 4:
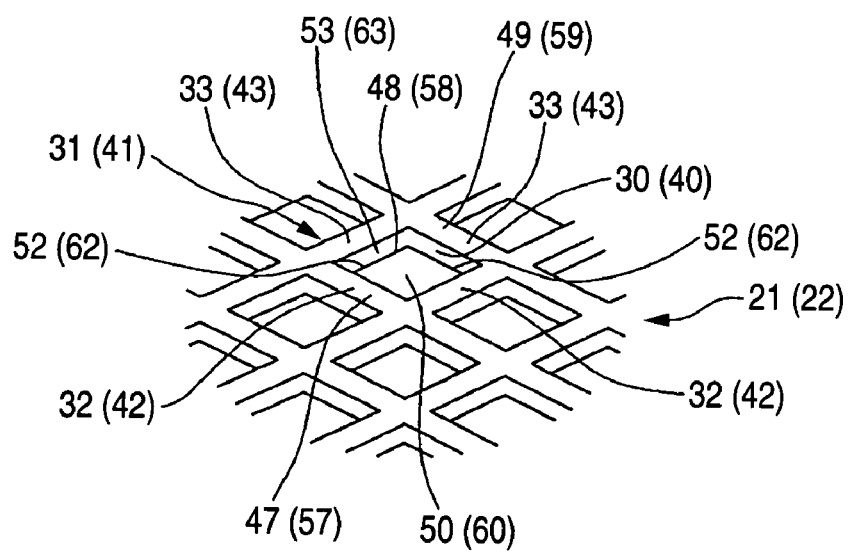
FIG. 4 is an enlarged front view of a right-side portion of an upper grill (or a lower grill) of the front bumper of the embodiment of the invention.
Figure 5:
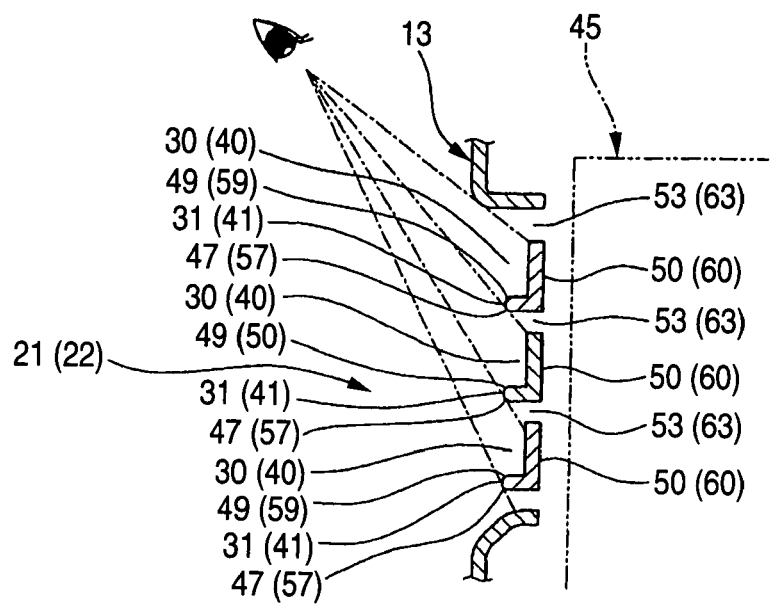
FIG. 5 is a fragmentally-enlarged cross-sectional view of a right-side portion of an upper grill (or a lower grill) of the front bumper of the embodiment of the invention.

As shown in FIG. 2, accessories 45 which are interior components are disposed in close proximity to and rearward of a right position with respect to the number plate mount sections 24, 25 of the upper and lower grills 21 and 22. As shown in FIG. 4, in order to keep the accessories 45 out of view, wall sections 50 are formed on the frame sections 31 located in a right-side predetermined range with respect to the number plate mount section 24 of the upper grill 21, wherein each wall section 50 stands upward from a lower portion 47 formed from two lower side sections 32 and whose upper end section 48 conforms in shape to the upper section 49 formed from the two upper side sections 33 of the frame section 31. Specifically, as mentioned previously, the frame section 31 forms a rhomboid shape, and hence the wall section 50 forms a rhomboid shape which is smaller than the frame section 31; i.e., the opening section 30. One upper side section 52 of the upper edge section 48 is in parallel to one upper side section 33 of the frame section 31 having the wall section 50 provided therein. The other upper side section 52 of the upper edge section 48 is in parallel to the other upper side section 33 of the frame section 31 having the wall section 50 provided therein. Consequently, in the frame sections 31 each having the wall section 50 formed therein, portions of the rhomboid opening sections 30, the portions assuming a substantially chevron shape, serves as through holes 53 penetrating through the frame section in the longitudinal direction of the vehicle. As shown in FIG. 5, the wall sections 50 stand upward from the rear end section of the lower sections 47 of the frame sections 31 and are offset from the front edge sections of the frame sections 31 in a rearward direction.

Similarly, as indicated by reference numerals provided in parentheses shown in FIG. 4, wall sections 60 are formed on the frame sections 41 located in a right-side predetermined range with respect to the number plate mount section 25 of the lower grill 22. Each wall section 60 is formed into a shape so that the wall section stands upward from a lower section 57 formed from two lower side sections 42 and so that an upper end section 58 conforms in shape to the upper section 59 formed from the two upper side sections 43 of the frame section 41. Specifically, as mentioned previously, the frame sections 41 form a rhomboid shape, and hence the wall sections 60 form a rhomboid shape smaller than the frame sections 41; i.e., the opening sections 40. One upper side section 62 of the upper edge section 58 is in parallel to one upper side section 43 of each frame section 41 having the wall section 60 provided therein. The other upper side section 62 of each upper edge section 48 is in parallel to the other upper side section 43 of each frame section 41 having the wall section 60 provided therein. Consequently, in the frame section 41 having the wall section 60 formed therein, a portion of the rhomboid opening section 40, the portion assuming a substantially chevron shape, serves as a through hole 63 penetrating through the grill in the longitudinal direction of the vehicle. As indicated by the reference numerals provided in parentheses shown in FIG. 5, each of the wall sections 60 stands upward from the rear end section of the lower section 57 of the frame section 41 and is offset from the front edge section of the frame section 41 in a rearward direction.

Figure 6:
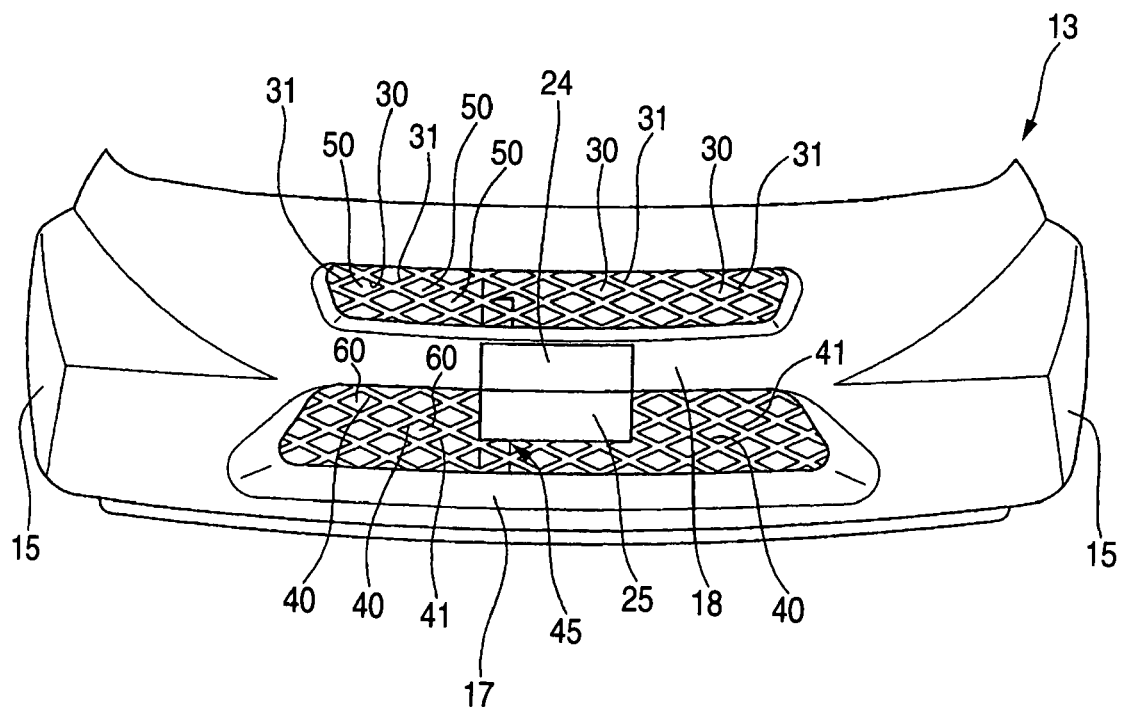
FIG. 6 is a view of the front bumper of the embodiment of the invention when viewed in an oblique direction.

The line of sight of a person in an ordinary standing position when viewing the vehicle from an upwardly oblique direction is interrupted as a result of the wall sections 50 overlapping the upper sections 49 of the frame sections 31. Moreover, the line of sight is interrupted as a result of the wall sections 60 overlapping the upper sections 59 of the frame sections 41. Consequently, as shown in FIG. 6, the accessories 45 serving as internal components are kept out of sight. Even when the person views the front of the vehicle body directly, the accessories 45 are slightly seen by the person, as shown in FIG. 2. However, viewing of the accessories 45 is made difficult by the wall sections 50, 60, and hence a sufficient blinding effect can be achieved.

According to the previously-described front bumper 13 of the present embodiment, the wall sections 50 are formed in a shape so that the wall sections stand upward on the frame sections 31 defining the opening sections 30 of the upper grill 21 and so that the upper edge sections 48 conform to the upper sections 49 of the frame sections 31.

The wall sections 60 are formed so as to stand upward on the frame sections 41 defining the opening sections 40 of the lower grill 22, and the upper edge sections 58 form the wall sections 60 having a shape conforming to the upper sections 59 of the frame sections 41. Therefore, the line of sight of the person when viewing the vehicle from an upwardly oblique position is interrupted as a result of the wall sections 50 overlapping the upper sections 49 of the frame sections 31 and as a result of the wall sections 60 overlapping the upper sections 59 of the frame sections 41. Thus, the accessories 45 that are internal components are kept out of view. As mentioned above, because of the structure in which the wall sections 50, 60 stand upward on the lower sections 47, 58 of the frame sections 31, 41, the bumper can basically be formed without regard to the dimension between the accessories 45, which are the internal components, and the bumper. Therefore, even when a sufficient dimensional allowance is not present between the accessories 45; i.e., the internal components, and the bumper, the accessories 45 can be kept out of view.

The opening sections 30, 40 form a rhomboid shape, and the wall sections 50, 60 form a rhomboid shape smaller than the opening sections 30, 40. Hence, the height of the through holes 53, 63 located in the area where the through holes are not blocked by the wall sections 50, 60 of the opening sections 30, 40 can be ensured, in turn ensuring ventilation performance and enables superior cooling of the accessories 45; i.e., the internal components, disposed at the rear of the opening sections.

As shown in FIG. 7, the opening sections 30, 40 may be made circular, and the wall sections 50, 60 may be formed so as to form an essentially-oval shape which is shorter than the opening sections 30, 40 in the vertical direction. In short, the essentially-oval wall sections 50, 60 are formed in the frame sections 31, 41 forming the circular sections 30, 40, wherein the wall sections stand upward from the lower sections 47, 57 and the upper edge sections 48, 58 form a shape conforming to the upper sections 49, 59 of the frame sections 31, 41. As a result, in the frame sections 31, 41 having the wall sections 50, 60 formed therein, portions which are situated on the upper sides of the circular opening sections 30, 40 and form an essentially crescent shape constitute the through holes 53, 63 penetrating through the grill in the longitudinal direction of the vehicle. Even in this case, there can be yielded the same advantage as that mentioned above.

What is claimed is:

1. A front bumper comprising:
a grill including a plurality of frame sections defining a plurality of opening sections that are arranged in an aligned manner; and
wall sections extending vertically upward from a rearward side of lower portions of respective frame sections, the wall sections extending into the opening sections of the grill, and
upper edge portions of the wall sections conform to upper portions of the frame sections.

2. The front bumper according to claim 1, wherein
the opening sections form a rhomboid shape, and
the wall sections form a rhomboid shape smaller than that of the opening sections.

3. The front bumper according to claim 1, wherein
the opening sections form a circular shape, and
the wall sections form an essentially-oval shape which is shorter than the opening sections in a vertical direction.

4. A front bumper comprising:
a grill in which a plurality of opening sections are arranged in an aligned manner; and
wall sections, wherein
the wall sections stand upward on lower portions of respective frame sections, defining the opening sections of the grill,
upper edge portions of the wall sections conform to upper portions of the frame sections
the opening sections form a circular shape, and
the wall sections form an essentially-oval shape which is shorter than the opening sections in a vertical direction.

5. A front bumper comprising:
a grill in which a plurality of opening sections are arranged in an aligned manner; and
wall sections, wherein
the wall sections stand upward on lower portions of respective frame sections, defining the opening sections of the grill,
upper edge portions of the wall sections conform to upper portions of the frame sections
the opening sections form a rhomboid shape having a width dimension greater than a height dimension, and
the wall sections form a rhomboid shape smaller than that of the opening sections.

* * * * *